United States Patent
Tan et al.

(10) Patent No.: US 10,579,015 B2
(45) Date of Patent: Mar. 3, 2020

(54) REFLECTIVE HOLOGRAPHIC DISPLAY APPARATUS AND DISPLAY METHOD FOR THE SAME

(71) Applicant: BOE TECHNOLOGY GROUP CO., LTD., Beijing (CN)

(72) Inventors: Jifeng Tan, Beijing (CN); Xue Dong, Beijing (CN); Wei Wang, Beijing (CN); Xin Gu, Beijing (CN); Feng Guan, Beijing (CN); Meili Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 120 days.

(21) Appl. No.: 15/750,917

(22) PCT Filed: Jul. 24, 2017

(86) PCT No.: PCT/CN2017/094042
§ 371 (c)(1),
(2) Date: Feb. 7, 2018

(87) PCT Pub. No.: WO2018/045836
PCT Pub. Date: Mar. 15, 2018

(65) Prior Publication Data
US 2019/0196401 A1  Jun. 27, 2019

(30) Foreign Application Priority Data
Sep. 9, 2016 (CN) .......................... 2016 1 0814868

(51) Int. Cl.
*G03H 1/22* (2006.01)
*G02F 1/13* (2006.01)
(Continued)

(52) U.S. Cl.
CPC .......... *G03H 1/2202* (2013.01); *G02B 27/22* (2013.01); *G02F 1/13* (2013.01); *G03H 1/22* (2013.01);
(Continued)

(58) Field of Classification Search
CPC ...... G02B 5/1866; G02B 5/1871; G03H 1/00; G03H 1/0005; G03H 2001/0088;
(Continued)

(56) References Cited

U.S. PATENT DOCUMENTS 5,225,920 A * 7/1993 Kasazumi ......... G02F 1/133528
349/1
6,122,465 A    9/2000 Hiyama
(Continued)

FOREIGN PATENT DOCUMENTS

CN    102033413 A    4/2011
CN    102483604 A    5/2012
(Continued)

OTHER PUBLICATIONS

First Office Action, including Search Report, for Chinese Patent Application No. 201610814868.4, dated Apr. 17, 2018, 16 pages.
(Continued)

*Primary Examiner* — Arnel C Lavarias
(74) *Attorney, Agent, or Firm* — Westman, Champlin & Koehler, P.A.

(57) ABSTRACT

A reflective holographic display apparatus and a display method thereof are provided. The reflective holographic display apparatus includes a front light source module, a display panel and a phase plate. The front light source module is configured to provide reference lights; the display panel is configured to adjust amplitude information of the reference lights, wherein the display panel includes a reflective layer and the front light source module is located at a
(Continued)

light exit side of the display panel; and the phase plate is configured to adjust phase information of the reference lights and located at a light exit side of the reflective layer.

20 Claims, 6 Drawing Sheets

(51) Int. Cl.
*G02B 27/22* (2018.01)
*G03H 1/02* (2006.01)
*G03H 1/08* (2006.01)

(52) U.S. Cl.
CPC ... *G03H 1/2294* (2013.01); *G03H 2001/0224* (2013.01); *G03H 2001/0858* (2013.01); *G03H 2001/2231* (2013.01); *G03H 2001/2271* (2013.01); *G03H 2210/30* (2013.01); *G03H 2223/13* (2013.01); *G03H 2223/23* (2013.01); *G03H 2225/34* (2013.01); *G03H 2225/52* (2013.01); *G03H 2225/55* (2013.01); *G03H 2240/42* (2013.01)

(58) Field of Classification Search
CPC ............ G03H 1/02; G03H 2001/0212; G03H 2001/0216; G03H 2001/0224; G03H 1/04; G03H 1/0402; G03H 2001/0415; G03H 2001/0428; G03H 2001/0434; G03H 1/0443; G03H 2001/0452; G03H 1/08; G03H 1/0866; G03H 1/10; G03H 1/22; G03H 1/2202; G03H 1/2205; G03H 2001/2223; G03H 2001/2231; G03H 2223/13; G03H 2223/23

USPC ...... 359/1, 9, 10, 11, 13, 22, 28, 30, 32, 33, 359/35; 430/1, 2
See application file for complete search history.

(56) References Cited

U.S. PATENT DOCUMENTS

| 9,442,460 | B2 | 9/2016 | Yoon et al. |
| 2012/0092735 | A1 | 4/2012 | Futterer et al. |
| 2013/0021545 | A1 | 1/2013 | Song et al. |
| 2013/0335795 | A1 | 12/2013 | Song et al. |
| 2014/0118508 | A1 | 5/2014 | Yoon et al. |
| 2016/0327906 | A1* | 11/2016 | Futterer ............ G02F 1/133553 |

FOREIGN PATENT DOCUMENTS

| CN | 103792826 A | 5/2014 |
| CN | 205334016 U | 6/2016 |
| CN | 105842925 A | 8/2016 |
| CN | 105917277 A | 8/2016 |
| CN | 106154798 A | 11/2016 |
| CN | 106154799 A | 11/2016 |
| CN | 106227017 A | 12/2016 |
| CN | 205992124 U | 3/2017 |

OTHER PUBLICATIONS

Written Opinion and English translation of Box No. 5 of Written Opinion for International Application No. PCT/CN2017/094042, dated Oct. 19, 2017, 7 pages.
International Search Report and English translation of International Search Report for International Application No. PCT/CN2017/094042, dated Oct. 19, 2017, 10 pages.

* cited by examiner

REFLECTIVE HOLOGRAPHIC DISPLAY APPARATUS AND DISPLAY METHOD FOR THE SAME

CROSS-REFERENCE TO RELATED APPLICATION

This application is a U.S. national phase application of International Application No. PCT/CN2017/094042, filed on 24 Jul. 2017, which has not yet published, and claims priority to Chinese Patent Application No. 201610814868.4, filed with the State Intellectual Property Office of China on Sep. 9, 2016, the contents of which are incorporated herein by reference in their entirety.

BACKGROUND OF THE DISCLOSURE

Field of the Disclosure

The present disclosure relates to the technical field of display, and in particular, to a reflective holographic display apparatus and a display method for the same.

Description of the Related Art

Transmission holographic display image is one of the most basic holographic display images. When the image is recorded, a coherent light is used to illuminate an object, the lights reflected off and scattered from a surface of the object arrive at a phase plate (i.e., a recording plate) to form object light waves; meanwhile another beam of reference light waves (planar light waves or spherical light waves) are introduced to illuminate the phase plate. After the phase plate is exposed to light, interference patterns (i.e., the holographic display images) can be obtained. Upon the image is reconstructed, the phase plate is illuminated with the same light waves as the reference light waves, eyes of a person can observe the transmission lights a passing through holographic plate, so that a reconstructed image which is exactly identical with the original object can be seen at a position of the original object behind the holographic plate. At this time, such reconstructed image is a virtual image. If the phase plate is illuminated with the light waves which are identical with conjugate light waves of the reference light waves, that is, the spherical light waves which are directed to the phase plate from the right side of the phase plate and converged at one point; then such light waves are diffracted by the phase plate and converged to form a real image of the original object.

However, in the related art, after the holographic plate is formed, the information about the phase and intensity has been fixed up and only one image can be displayed. Though only several images can be formed after superimposing the phase plates, it is impossible to achieve dynamic display.

SUMMARY

An object of embodiments of the present disclosure is to provide a reflective holographic display apparatus and a display method for the same.

In one aspect, it provides a reflective holographic display apparatus, comprising:

a front light source module, configured to provide reference lights;

a display panel, configured to adjust amplitude information of the reference lights, wherein the display panel comprises a reflective layer and the front light source module is located at a light exit side of the display panel; and a phase plate, configured to adjust phase information of the reference lights and located at a light exit side of the reflective layer.

In one example, the display panel further comprises a plurality of pixel unit groups, each of which comprises at least one independently driven sub-pixel.

In one example, respective sub-pixels in a same pixel unit group display a same color.

In one example, the phase plate comprises a plurality of phase plate units in one-to-one correspondence with the pixel unit groups, each of the phase plate units comprises a plurality of sub-regions.

In one example, respective sub-regions in a same one phase plate unit correspond to different heights of the phase plate respectively.

In one example, respective sub-regions in a same one phase plate unit correspond to different refraction indexes of the phase plate respectively.

In one example, in one of the pixel unit groups and a phase plate unit corresponding to the one of the pixel unit groups, respective sub-pixels are in one-to-one correspondence with respective sub-regions.

In one example, in one of the pixel unit groups and a phase plate unit corresponding to the one of the pixel unit groups, one sub-pixel corresponds to a plurality of sub-regions.

In one example, the display panel comprises an array substrate on which the reflective layer is provided.

In one example, the phase plate is directly provided on the light exit side of the reflective layer.

In one example, the display panel further comprises an opposing substrate opposite to the array substrate;

the phase plate is provided on a side of the opposing substrate facing the array substrate; or the phase plate is provided on a side of the opposing substrate away from the array substrate.

In one example, the phase plate is provided on a side of the front light source module away from the display panel; or the phase plate is provided on a side of the front light source module facing the display panel.

In one example, a color filter layer and/or a polarizer sheet are/is provided on the light exit side of the display panel.

In one example, a color filter layer is provided on the light exit side of the array substrate, and the phase plate is provided between the reflective layer and the color filter layer.

In one example, the amplitude information comprises gray scale and colors of the reference lights.

In one example, the front light source module is a light source module with side entry light, and comprises a light guide plate and a light emitting diode located on a light incidence side of the light guide plate.

In one example, the front light source module is a light source module with bottom entry light and comprises a back plate and a light emitting diode located on the back plate and disposed adjacent to the light exit side of the display panel.

In one example, the display panel comprises a liquid crystal display panel, and the reference lights provided by the front light source module is collimated lights.

In one example, the phase plate comprises transmissive gratings, reflective gratings, blazed gratings, or echelon gratings.

In another aspect, it also provides a display method for the reflective holographic display apparatus as described above, comprising:

providing the reference lights by the front light source module;

adjusting the phase information of the reference lights by the phase plate to present holographic display at a set position; and adjusting the amplitude information of the reference lights by the display panel to present dynamic holographic images.

DETAILED DESCRIPTION OF PREFERRED EMBODIMENTS OF THE DISCLOSURE

Figure 1:
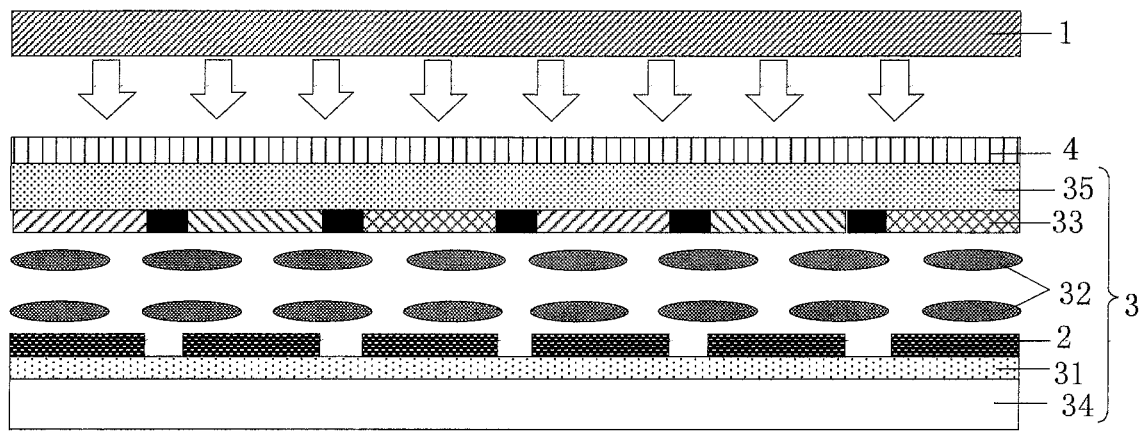
FIG. 1 is a schematic view showing a structure of a reflective holographic display apparatus provided by an embodiment of the present disclosure.

Below, specific implementations of a reflective holographic display apparatus and a display method for the same provided by an embodiment of the present disclosure will be explained in detail with reference to the accompanied drawings.

Shapes and thicknesses of various layers and films in drawings do not reflect real scales of the reflective holographic display apparatus, but are intended to illustratively explain the content of the present disclosure.

An embodiment of the present disclosure provides a reflective holographic display apparatus, as shown in FIGS. 1-7, including: a front light source module 1 for providing reference lights, a phase plate or retardation plate 2 for adjusting phase information of the reference lights and a display panel 3 for adjusting amplitude information of the reference lights. Specifically, the front light source module 1 is located at a light exit side of the display panel 3, the display panel 3 has a reflective layer 31 and the phase plate 2 is located at a light exit side of the reflective layer 31.

It should be noted that all the display panels 3 shown in FIGS. 1-7 are liquid crystal display panels, and thus the reference numeral 32 represents a liquid crystal layer. The display panel in the reflective holographic display apparatus provided by an embodiment of the present disclosure is not only provided as a liquid crystal display panel, but also can be provided as other display panels. They are not limited only to structures shown in drawings of the present disclosure, and the present disclosure does not make any particular limitations on the types and structures of the display panels. In addition, the display panel is used to adjust the amplitude information of the reference lights, which can include information about gray scale and colors.

Figure 8:
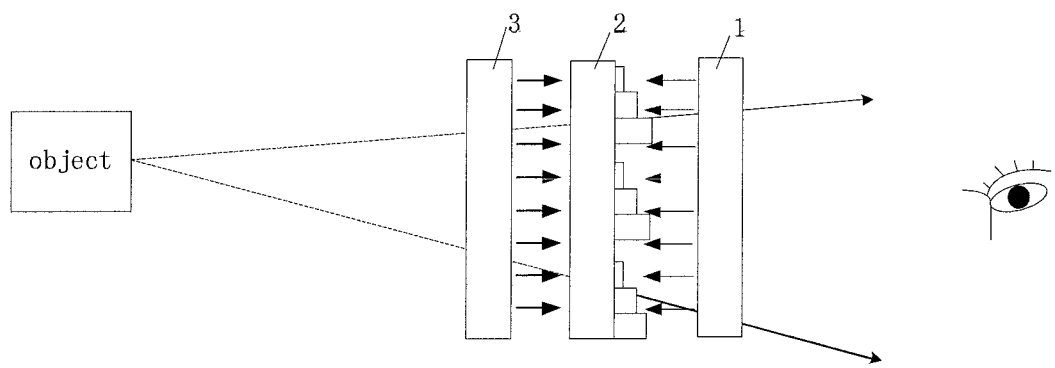
FIG. 8 is a schematic view showing a principle of a reflective holographic display apparatus provided by an embodiment of the present disclosure.

The reflective holographic display apparatus provided by the embodiment of the present disclosure, is provided with the front light source module for providing the reference lights, the phase plate for adjusting the phase information of the reference lights and the display panel for adjusting the amplitude information of the reference lights. The front light source module is located at the light exit side of the display panel, the display panel has the reflective layer and the phase plate is located at the light exit side of the reflective layer. As shown in FIG. 8, since the reflective holographic display apparatus provided by the embodiment of the present disclosure is provided with the front light source module 1, the phase plate 2 and the display panel 3. The information about the gray scale and the colors is provided by the display panel 3, the phase information is provided by the phase plate 2, and the reference lights are provided by the front light source module 1, and then are adjusted by the display panel 3 and the phase plate 2 so that the holographic image can be achieved. The gray scale and the color of the display panel 3 can be adjusted and matched with the phase on the phase plate 2, so as to switch among images having different brightness, colors and depth of focus. By this way, the reflective dynamic three dimensional holographic display can be achieved and the real presentation of the object in space can be achieved also.

In a specific implementation, in the reflective holographic display apparatus provided by an embodiment of the present disclosure, as shown in FIGS. 1-4, the display panel includes an array substrate 34, on which a reflective layer 31 can be directly provided.

Figure 2:
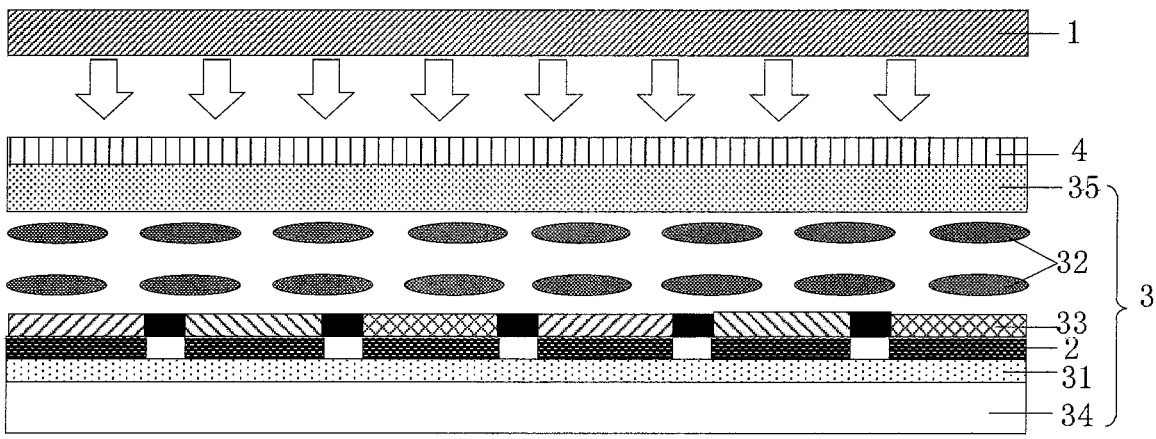
FIG. 2 is a schematic view showing a structure of a first variant of a reflective holographic display apparatus provided by an embodiment of the present disclosure.

In a specific implementation, in the reflective holographic display apparatus provided by an embodiment of the present disclosure, when the phase plate is located at the array substrate 34, as shown in FIGS. 1-2, the phase plate 2 can be directly disposed on the reflective layer 31.

Figure 3:
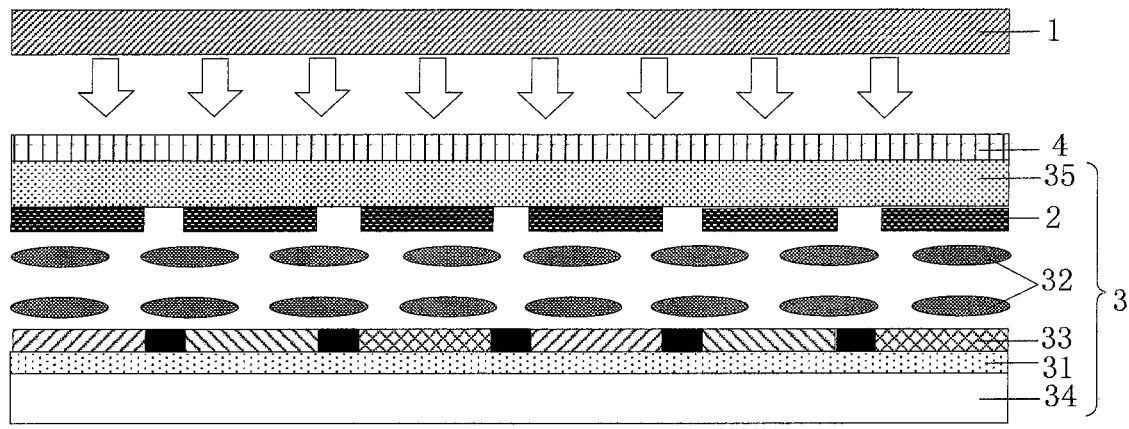
FIG. 3 is a schematic view showing a structure of a second variant of a reflective holographic display apparatus provided by an embodiment of the present disclosure.
Figure 4:
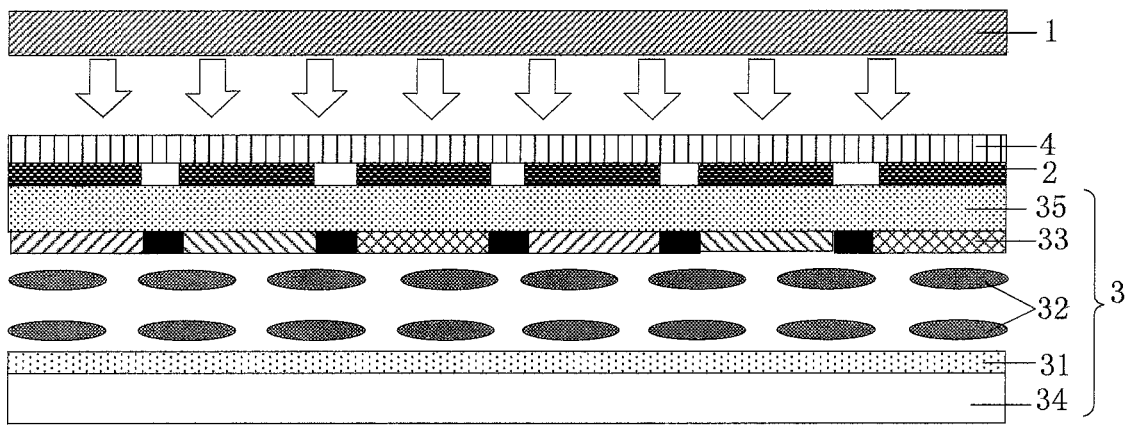
FIG. 4 is a schematic view showing a structure of a third variant of a reflective holographic display apparatus provided by an embodiment of the present disclosure.

In a specific implementation, in the reflective holographic display apparatus provided by an embodiment of the present disclosure, the display panel further includes an opposing substrate 35 to the array substrate 34; when the phase substrate is located on the opposing substrate 35; as shown in FIG. 3, the phase plate 2 can be positioned at a side of the opposing substrate 35 facing the array substrate 34; or as shown in FIG. 4, the phase plate 2 can be positioned at a side of the opposing substrate 35 away from the array substrate 34.

It should be noted that the display panel may further include a color filter layer 33, which either can be provided on the opposing substrate 35 or on the array substrate 34. Specifically, when the color filter layer is provided at a side of the opposing substrate 35 facing the liquid crystal layer 32; as shown in FIG. 1, the phase plate 2 can be directly positioned on the reflective layer 31, or as shown in FIG. 4, the phase plate 2 can be positioned at a side of the opposing substrate 35 away from the liquid crystal layer.

As shown in FIG. 2, the phase plate 2 is provided between the reflective layer 31 and the color filter layer 33 of the array substrate 34, or as shown in FIG. 3, the phase plate 2 can be positioned at a side of the opposing substrate 35 facing the array substrate 34 while the color filter layer 33 is directly provided on the reflective layer 31 of the array substrate 34.

Of course, there can be a variety of position relationships between the color filter layer 33 and the phase plate 2, rather than limiting to the positional relationships shown in FIGS. 1-4, for example, the phase plate 2 can be directly provided on the color filter layer 33 or the like.

It should be noted that the structure in FIG. 2 can reduce the risk of mixing colors, and prevent the occurrence of color deviation phenomenon.

Figure 5:
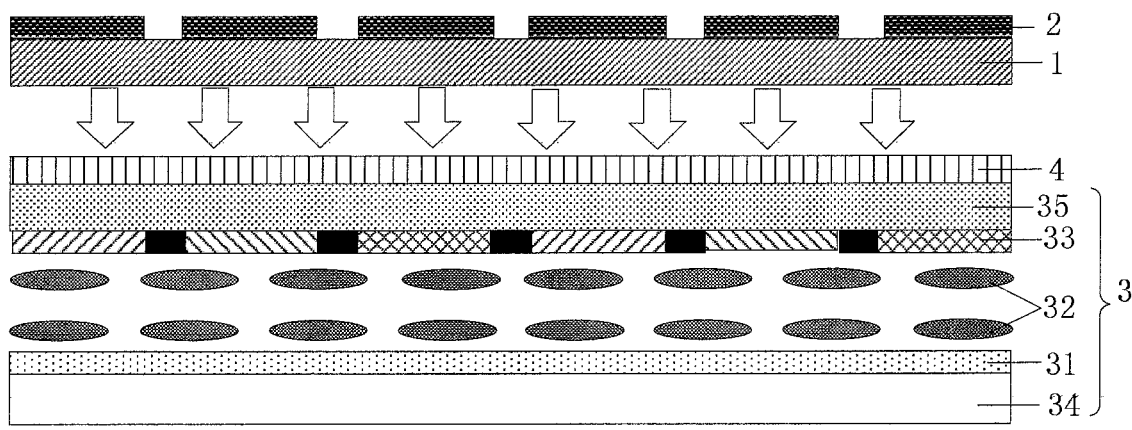
FIG. 5 is a schematic view showing a structure of a fourth variant of a reflective holographic display apparatus provided by an embodiment of the present disclosure.
Figure 6:
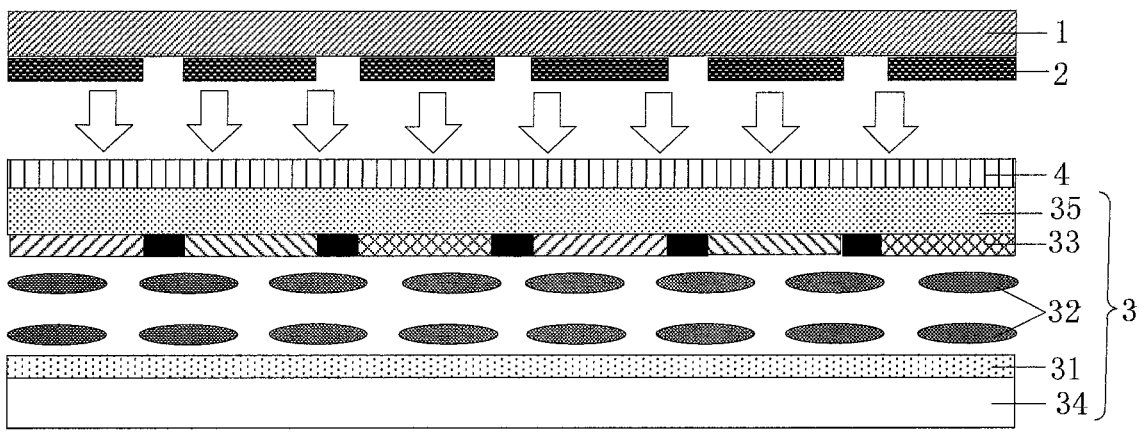
FIG. 6 is a schematic view showing a structure of a fifth variant of a reflective holographic display apparatus provided by an embodiment of the present disclosure.

In addition, in a specific implementation, in the reflective holographic display apparatus provided by the embodiment of the present disclosure, when the phase plate 2 is located on the front light source module; as shown in FIG. 5, the phase plate 2 can be provided at a side of the front light source module 1 away from the display panel 3, or as shown in FIG. 6, the phase plate 2 can be provided at a side of the front light source module 1 facing the display panel 3.

Figure 7:
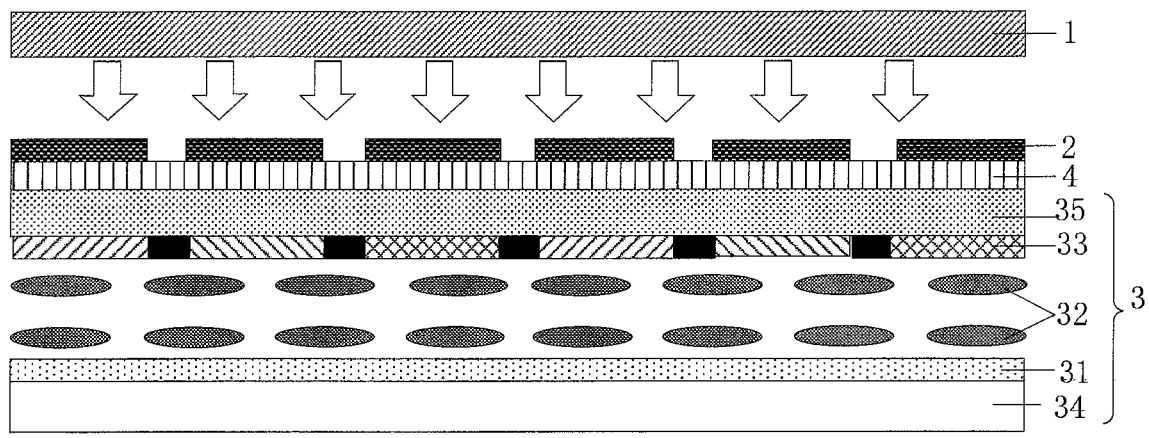
FIG. 7 is a schematic view showing a structure of a sixth variant of a reflective holographic display apparatus provided by an embodiment of the present disclosure.

Or, in a specific implementation, in the reflective holographic display apparatus provided by the embodiment of the present disclosure, a polarizer sheet 4 can be provided on the light exit side of the display panel; and as shown in FIG. 7, the phase plate 2 can also be provided on the polarizer sheet 4.

It should be noted that as shown in FIGS. 5-7, the color filter layers 33 all are disposed on a side of the opposing substrate 35 facing the liquid crystal layer. Of course, the color filter layer 33 can also be provided on the array substrate 34. At this time, there can be a plurality of the positional relationships between the color filter layer and the phase plate, rather than limiting to these positional relationships shown in FIGS. 5-7.

Furthermore, in the structure in FIG. 5, the lights only need to be passed through the phase plate once, and the optical path thereof becomes relatively simple.

Further, it should be noted that the reflective layer 31 can also be used as a common electrode or a pixel electrode of the array substrate 34, so as to simplify the structure. Therefore, the reflective layer 31 is sometimes called as the reflective electrode.

Figure 9:
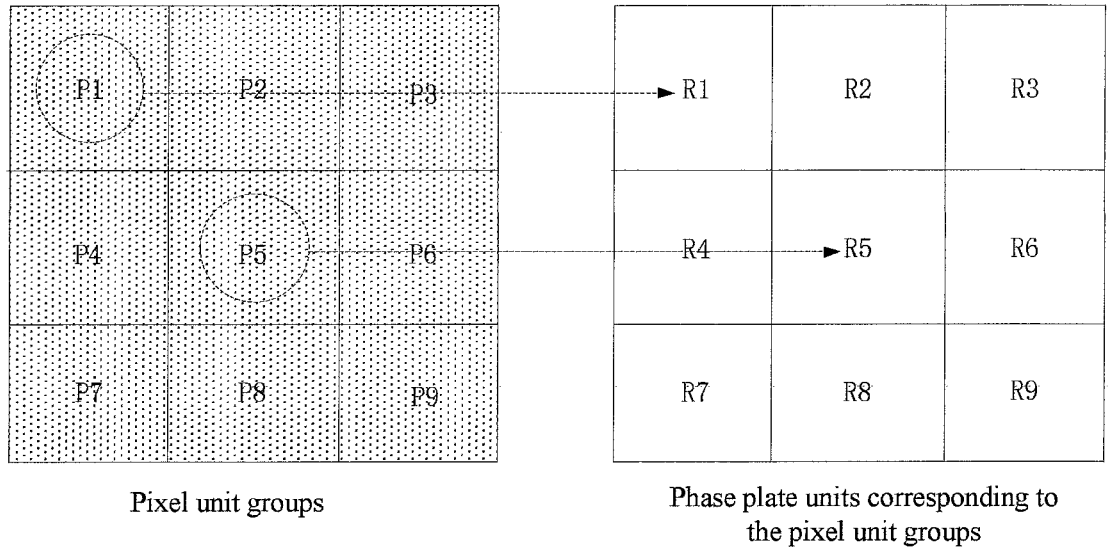
FIG. 9 is a schematic view showing a corresponding relationship between sub-pixels and sub-regions within a reflective holographic display apparatus provided by an embodiment of the present disclosure.
Figure 10:
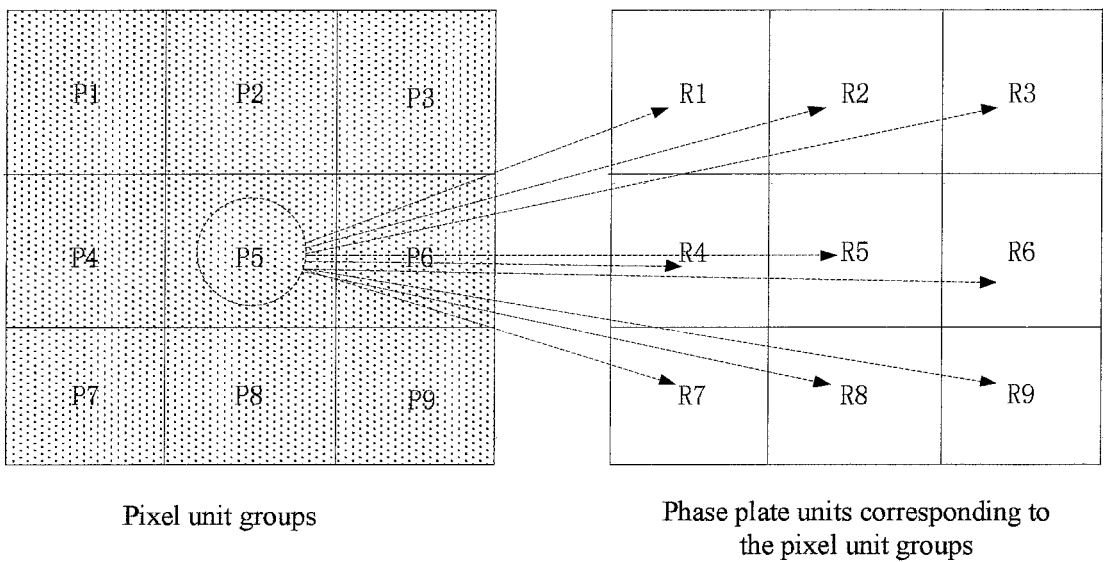
FIG. 10 is a schematic view showing another corresponding relationship between sub-pixels and sub-regions within a reflective holographic display apparatus provided by an embodiment of the present disclosure.

In a specific implementation, in the reflective holographic display apparatus provided by the embodiment of the present disclosure, the display panel includes a plurality of groups of pixel units, respective pixel unit groups each includes at least one sub-pixel to be independently driven; respective sub-pixels in the same pixel unit group present the same color. The number of the sub-pixels is set to be N, where N≥2, and the lager the value of N is, the more clear the reconstructed image becomes. As shown in FIGS. 9 and 10, one pixel unit group is divided into 9 sub-pixels having the same size, respectively P1~P9.

In a specific implementation, in the reflective holographic display apparatus provided by the embodiment of the present disclosure, the phase plate 2 can have a plurality of phase plate units in one-to-one correspondence to the respective pixel unit groups; each of the respective phase plate units can be divided into a plurality of sub-regions, and respective sub-regions in the same phase plate unit have different phases.

Specifically, the respective sub-regions of the same phase plate unit correspond to different heights on the phase plate, or the respective sub-regions of the same phase plate unit correspond to different refraction indexes of the phase plate. In this way, different phases are selected, so that it can achieve the different phases of the exit lights. The light waves having different phases converged into a person's eyes, and thus the different depths of focus can be achieved. As shown in FIGS. 9 and 10, the pixel unit groups shown at the left hand are in one-to-one correspondence with the phase plate units shown at the right hand. The phase plate unit is divided into 9 sub-regions having the same sizes, respectively R1~R9.

It should be noted that the phase plate provided by the embodiment of the present disclosure is commonly formed by diffraction gratings, and can be classified as the transmissive one and the reflective one depending on the working modes. The reflective gratings are traces graved on a metal mirror, on which total reflection occurs, but on the non-graved portions diffraction occurs along the direction of the reflection light. Therefore, they are equivalent to a group of diffraction gratings. The transmissive gratings are meant to traces graved on an optically planar glass with an equal spacing, in which no light is transmitted at the traces and the non-graved portions are transparent slits.

Theoretically, the diffraction angle θ of $m^{th}$ order diffraction wave of the grating only depends on a period P of the grating, a wavelength λ of the incidence wave and an incidence angle $\theta_0$, $$\sin\theta - \sin\theta_0 = m\lambda/P (m=0,\pm 1,\pm 2,\ldots) \quad (1)$$

Normally, zeroth and first order diffractions of the transmissive grating have relatively larger diffraction intensities. The diffraction orders which are higher than the zeroth and first diffraction orders, have a diffraction intensity much smaller than those of the latters. The zeroth order diffraction is in the direction of the incidence light, and the diffraction direction of the first diffraction wave can be adjusted by the period of the grating, so what is used to adjust the angle of the lights herein is generally the first diffraction wave (when the exit direction equals or is very close to the incidence wave, it is also possible to use the zeroth order diffraction wave). When the direction of the exit light is determined, the periods of the gratings to which the lights having different colors correspond are decided by the equation (1). The duty cycle is typically 0.5, but in the practical product design, it may deviate such value (for example, for sake of the reasons of adjusting the intensity of the exit light, balancing the differences of the brightness at different positions of the display panel, process conditions or the like). The height of the grating is generally approximately 300 nm, which may become larger, for example 1 μm, or become smaller for example 200 nm. For the purpose of eliminating, reducing or increasing the zeroth order diffraction wave of some color light, the height of the grating can be designed with respect to such wavelength. Because the incidence angle is fixed, when such color light has a phase difference, between the solid bar and the spacing on the grating, of odd times of the half-wavelength, the zeroth order diffraction wave will have destructive interference, and thus the zeroth order wave are attenuated by the interference, and the first order wave is enhanced; when the phase difference becomes integer times of the wavelength, the zeroth order wave will have constructive interference, and the first order wave is attenuated.

The different heights of the grating can be chosen to the light with different colors, but they also can be chosen to be identical with each other.

The phase plate can be transmissive gratings, reflective gratings, blazed gratings, echelon gratings, which can all be theoretically explained by the above equation. The blazed grating is also one kind of the reflective gratings, but its graved surface is not parallel to the surface of the grating, with an angle γ between them. By this way, a single groove surface (corresponding to a single slit) diffraction has a central maximum and primary maximums at the interference zeroth orders among the respective groove surfaces. The position of the central maximum and these primary maximums at the interference zeroth orders are separated from each other, so that the light energy is transferred from the primary maximums at the interference zeroth order to and concentrated onto a certain order spectrum, thereby achieving the blazing of the order spectrum.

Further, in a specific implementation, in the reflective holographic display apparatus provided by the embodiment of the present disclosure, as for one pixel unit group and the phase plate unit corresponding to the pixel unit group, as shown in FIG. 9, respective sub-pixels are in one-to-one correspondence with the respective sub-regions, that is, P1 corresponds with R1, P2 corresponds with R2, P3 corresponds with R3, P4 corresponds with R4, P5 corresponds with R5, P6 corresponds with R6, P7 corresponds with R7, P8 corresponds with R8, P9 corresponds with R9. At this point, in one example, the reference light is selected to be a collimated light. Or, as shown in FIG. 10, one sub-pixel corresponds with a plurality of sub-regions, that is, P5 corresponds with R1, R2, R3, R4, R5, R6, R7, R8 and R9. In this case the reference light is selected to be an incidence light having a certain scattering angle.

In a specific implementation, in the reflective holographic display apparatus provided by the embodiment of the present disclosure, the front light source module can be provided to be of side entry light type or bottom entry light type. When the front light source module employs the side entry light, it specifically includes a light guide plate and a light emitting diode located at the incidence side of the light guide plate. Or, alternatively, when the front light source module employs the bottom entry light, it specifically includes a back plate and a light emitting diode located on the back plate and adjacent to the light exit side of the display panel. In one example, the front light source module is provided to be of bottom entry light type.

It should be noted that the reference light can be a surface light source or a spot light source, a collimated light or non-collimated light. In one example, the reference light can be provided to be a collimated coherent light. The acquisition of the reference light can be achieved by replacing the holographic plate by CCD (Charge-coupled Device) or CMOS(Complementary Metal-Oxide-Semiconductor) upon recording the holographic images, and converting the 3D topography on the surface of the object acquired by the CCD or CMOS into a digital holographic information, used as the information of the reference light.

In a specific implementation, the reflective holographic display apparatus provided by the embodiment of the present disclosure typically has other film layer structures such as black matrix layer, an insulation layer. Further, it is common to form the structures such as thin film transistors, gate lines, data lines on the base substrate. These specific structures can be implemented in many ways, and are not limited herein. The person skilled in the art will understand that the reflective holographic display apparatus might have other necessary integral parts, which are not discussed herein and are not interpreted to limit the present disclosure.

Based on the same inventive concept, an embodiment of the present disclosure also provides a display method for the above described reflective holographic display apparatus. Because the method solves the problem with the similar principle to the above described reflective holographic display apparatus, the implementation of such display method can be referred to the implementation of the reflective holographic display apparatus, which will not be repeated again.

Figure 11:
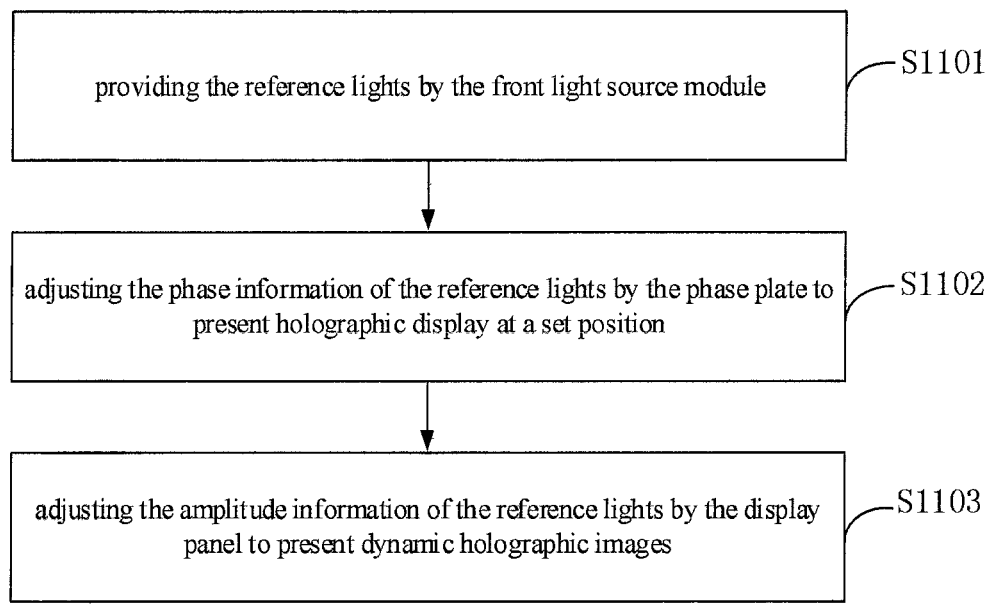
FIG. 11 is a flow chart showing a display method of a reflective holographic display apparatus provided by an embodiment of the present disclosure.

In a specific implementation, the display method for the reflective holographic display apparatus provided by an embodiment of the present disclosure, as shown in FIG. 11 specifically includes the steps of:

S1101, providing reference lights by the front light source module;

S1102, adjusting phase information of the reference lights by the phase plate to present holographic display at a set position;

S1103, adjusting amplitude information of the reference lights by the display panel to present dynamic holographic images.

With the reflective holographic display apparatus and the display method for the same provided by the embodiment of the present disclosure, the reflective holographic display apparatus is provided with the front light source module for providing the reference lights, the phase plate for adjusting the phase information of the reference lights, and the display panel for adjusting the amplitude information of the reference lights. The front light source module is located at the light exit side of the display panel, the display panel has the reflective layer and the phase plate is located at the light exit side of the reflective layer. Because the front light source module, the phase plate and the display panel are provided in the reflective holographic display apparatus provided by the embodiment of the present disclosure, the intensity and color information are provided by the (liquid crystal) display panel, the phase information is provided by the phase plate, the reference light wave is provided by the collimated backlight and are subsequently adjusted by the liquid crystal display panel and the phase plate (retardation plate), so as to achieve the imaging of the holographic image. The switching among the images of different brightness, colors and depth of focus can be achieved by adjusting the gray scale and colors on the display panel, and matching them to the phase on the phase plate, so that the reflective dynamic three dimensional holographic display can be achieved and the real presentation of the object in the space will be achieved.

Apparently, the skilled person in the art can make various modifications and variations on the present disclosure without departing spirit and scope of the present disclosure. In this way, the present disclosure is also intended to cover these modifications and variations if these modifications and variations fall within claims and equivalents thereof of the present disclosure.

What is claimed is:
1. A reflective holographic display apparatus, comprising:
   a front light source module, configured to provide reference lights;
   a display panel, configured to adjust amplitude information of the reference lights, wherein the display panel comprises a reflective layer and the front light source module is located at a light exit side of the display panel; and a phase plate, configured to adjust phase information of the reference lights and located at a light exit side of the reflective layer.

2. The reflective holographic display apparatus according to claim 1, wherein the display panel further comprises a plurality of pixel unit groups, each of which comprises at least one independently driven sub-pixel.

3. The reflective holographic display apparatus according to claim 2, wherein respective sub-pixels in a same pixel unit group display a same color.

4. The reflective holographic display apparatus according to claim 2, wherein the phase plate comprises a plurality of phase plate units in one-to-one correspondence with the pixel unit groups, each of the phase plate units comprises a plurality of sub-regions.

5. The reflective holographic display apparatus according to claim 4, wherein respective sub-regions in a same one phase plate unit correspond to different heights of the phase plate respectively.

6. The reflective holographic display apparatus according to claim 4, wherein respective sub-regions in a same one phase plate unit correspond to different refraction indexes of the phase plate respectively.

7. The reflective holographic display apparatus according to claim 4, wherein in one of the pixel unit groups and a phase plate unit corresponding to the one of the pixel unit groups, respective sub-pixels are in one-to-one correspondence with respective sub-regions.

8. The reflective holographic display apparatus according to claim 4, wherein in one of the pixel unit groups and a phase plate unit corresponding to the one of the pixel unit groups, one sub-pixel corresponds to a plurality of sub-regions.

9. The reflective holographic display apparatus according to claim 1, wherein the display panel comprises an array substrate on which the reflective layer is provided.

10. The reflective holographic display apparatus according to claim 9, wherein the phase plate is directly provided on the light exit side of the reflective layer.

11. The reflective holographic display apparatus according to claim 9, wherein the display panel further comprises an opposing substrate opposite to the array substrate;
the phase plate is provided on a side of the opposing substrate facing the array substrate; or
the phase plate is provided on a side of the opposing substrate away from the array substrate.

12. The reflective holographic display apparatus according to claim 9, wherein the phase plate is provided on a side of the front light source module away from the display panel; or
the phase plate is provided on a side of the front light source module facing the display panel.

13. The reflective holographic display apparatus according to claim 9, wherein at least one of a color filter layer and a polarizer sheet is provided on the light exit side of the display panel.

14. The reflective holographic display apparatus according to claim 9, wherein a color filter layer is provided on the light exit side of the array substrate, and the phase plate is provided between the reflective layer and the color filter layer.

15. The reflective holographic display apparatus according to claim 1, wherein the amplitude information comprises gray scale and colors of the reference lights.

16. The reflective holographic display apparatus according to claim 1, wherein the front light source module is a light source module with side entry light, and comprises a light guide plate and a light emitting diode located on a light incidence side of the light guide plate.

17. The reflective holographic display apparatus according to claim 1, wherein the front light source module is a light source module with bottom entry light and comprises a back plate and a light emitting diode located on the back plate and disposed adjacent to the light exit side of the display panel.

18. The reflective holographic display apparatus according to claim 1, wherein the display panel comprises a liquid crystal display panel, and the reference lights provided by the front light source module is collimated lights.

19. The reflective holographic display apparatus according to claim 1, wherein the phase plate comprises transmissive gratings, reflective gratings, blazed gratings, or echelon gratings.

20. A display method for the reflective holographic display apparatus according to claim 1, comprising:
providing the reference lights by the front light source module;
adjusting the phase information of the reference lights by the phase plate to present holographic display at a set position; and
adjusting the amplitude information of the reference lights by the display panel to present dynamic holographic images.

* * * * *